Oct. 9, 1951        C. F. ELLIOTT        2,570,533

UNIVERSAL AUTOMOBILE COVER

Filed June 6, 1949

INVENTOR.

*Charles F. Elliott*

Patented Oct. 9, 1951

2,570,533

UNITED STATES PATENT OFFICE 2,570,533

UNIVERSAL AUTOMOBILE COVER

Charles F. Elliott, Fairfax, Va.

Application June 6, 1949, Serial No. 97,421

4 Claims. (Cl. 150—52)

This invention relates to automobile covers for affording protection from the elements in lieu of more permanent shelters, such as garages. It has been the purpose of workers in this field for many years to provide covers which would adequately protect the car surface from the effects of the sun during the day and of dew and frost at night. The finish of automobiles should also be protected from the deposit of dust, soot and in certain coastal areas from the saline atmosphere. It is a matter of common knowledge that such deposits are accumulated much more rapidly on cars which are stationary than upon cars in motion. Basic requirements, obviously, are that the cover must provide a substantial measure of protection for the car, it should be easy to install and remove and it should be durable and relatively inexpensive. The expedients heretofore proposed have fallen somewhat short of the desired characteristics of utility for a number of reasons.

In general, prior art covers of which I am aware, have not been satisfactory from the standpoint of car protection due to the incompatibility of weather resistant qualities and light weight. Accordingly, it was necessary for water-repellant material to be heavy to possess the requisite durability for various weather conditions. Covers of such material also were bulky in storage, difficult to install and were relatively expensive. On the other hand, covers possessing the desired lightness were inadequate as to the other factors.

In the past, cover design has attempted to duplicate in panel fashion and detail the body outline of a particular automobile. This was no doubt, considered the best and perhaps the only feasible line of development since until recent years the dimensions and contours of automobiles were highly individual. At the present time, however, a leading car manufacturer employs the identical body on several competing lines of cars sold by its subsidiaries. And even where the body outline of the cheapest 4-door sedan, for example, is compared to the most expensive make of such manufacturer, the principal difference will be found to be one of overall length. From the foregoing it will be seen that a beginning in the direction of standardization of car cover sizes is possible.

A more significant characteristic of present day car designs, however, is to be found in the smooth contours, usually known to the public as streamlining. Thus, in their profiles, modern automobiles of different manufacturers bear a great resemblance to each other. This observation has emphasized the feasibility of providing for the first time, an automobile cover that is readily adjustable to fit practically all standard sized models on the market today.

It is accordingly an object of this invention to provide an automobile cover that may be adjusted into fully protecting position on both 2-door and 4-door models of various, overall body dimensions.

A further object of the invention is to provide an automobile cover that may be made of a single sheet of material as distinguished from the multi-panel construction of the prior art.

Another object of the invention is to provide an automobile cover that may be brought into snugly fitting relation beneath the overhanging front and rear portions of the automobile for a greater or less extent depending upon the overall length of the automobile.

Another object of the invention is to provide an automobile cover that is not only adjustable to fit automobiles of different body types and overall dimensions, but also may be snugly fitted thereto at the points of principal contour variation, and hence, stress; for example, at the intersection of the cowl and windshield, the intersection of the rear window and rear deck, etc.

Another object of the invention is to provide an automobile cover of the class described which is moderately expansible under the influence of heat and tension and accordingly, more snugly conforms to the body contour of a particular automobile the longer it is used.

Another object of the invention is to provide an automobile cover which utilizes the customary radiator ornament of the automobile as a centering means for facilitating installation of the cover.

An additional object is to provide a novel method of conforming a thermoplastic sheet of material to the contour of an automobile as a cover therefor.

A still further object of the invention is to provide an automobile cover that not only covers the body of the automobile, but is disposable inwardly beneath the lower edge of the body to limit the circulation of air between the cover and the body surface.

Yet another object is to provide an automobile cover of fully transparent material, that affords a high degree of protection, is light in weight, simply and quickly installed and removed, and is easily and inexpensively manufactured.

Other objects and advantages of the invention will be apparent from a consideration of the following description and the accompanying drawing wherein Figure 1 is a plan view of a preferred form of the cover of this invention, ready for initial installation upon an automobile, the marginal gathering of the material by the elastic cord within the hem being omitted for clarity;

Figure 1:
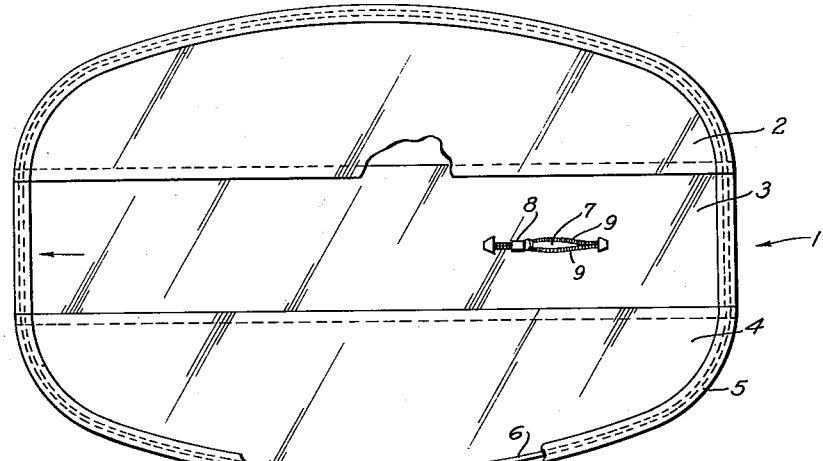

Referring now to Figure 1 there is shown in plan view and to a more reduced scale than the remaining figures of the drawing, a preferred form of my improved cover. Such cover which is generally designated by the reference numeral 1 is formed, for convenience, of three sheets of rectangular configuration 2, 3, and 4 disposed in side-by-side relation and united along their overlapping edges. The sheet material may be of various compositions; that which I have found to be most satisfactory, however, is of the group known as thermo-plastic elastomers and preferably polymerized, vinyl chloride or "Vinylite." Such material is moderately elastic at warm room temperatures and when heated as by solar radiation and when concurrently subjected to stress, will retain to a considerable extent the expanded area and configuration to which it has been stretched. The effect is somewhat analogous to stretching beyond the elastic limit of ordinary elastic materials such as rubber, for example, but with the important difference that, within limits, the thermo-plastic material is not weakened seriously although there is, of course, some reduction in thickness of the sheet.

The use of three sheets of the same approximate width, marginally overlapped as shown and stitched together or heat bonded as is well known in the art is indicated in the drawing since a single sheet of equivalent width is not so easy to obtain commercially. In either event the corner portions of the composite sheet 1 are then cut away as shown to provide a cover body of generally elliptical outline. The margin of the elliptical body is thereafter provided with means for gathering or constricting the same such as a hem 5 preferably formed by overlapping the peripheral portion of the body as indicated in Fig. 1 and of sufficient width to receive freely therein a continuous, elastic cord 6, for example, for tensioning the cover body upon the automobile body as will be more fully described hereinafter.

Along the major axis and toward one end of the cover 1 is provided means for centering the cover upon the hood of an automobile and which preferably comprises a longitudinal slit 7 which is adapted to be closed from its inner end outwardly to any desired point therealong. The closure means may take the form of a conventional slide fastener 8 having the usual locking projection to fixedly engage the fastener track 9 as is well known.

The cover body as described is now disposed in protecting position over the automobile of Figure 2 in the following manner. After first subjecting the cover to elevated room temperature, for example, sufficient to slightly soften the thermoplastic sheet material, say between 80 and 100 degrees, Fahrenheit and with the closure 8 for the slide fastener disposed to allow a complete opening of the slit 7, the cover is then laid over the car hood with the radiator ornament 10 projecting upwardly through said slit and the hem and cord portion of the right end of the cover disposed beneath the front bumper 11 of the car. The hem with its enclosed cord portion of the left end of the cover is then grasped and pulled backwardly over the top of the car and downwardly to a position beneath the rear bumper 12 of the car as is clearly shown in Figure 2. To more easily identify the midpoint of such end portion, any suitable indicia may be employed, such as an axially imprinted stripe of contrasting color.

Figure 2:
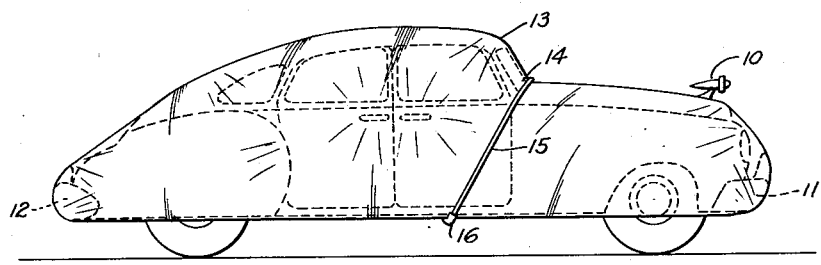
Figure 2 is a side elevation showing the final form-fitting installation of the cover of Figure 1 upon a modern 4-door sedan and with the transverse elastic cord shown in place.

When the slide fastener 8 is closed to snugly engage the base of the car radiator ornament 10, the cover will be found to be in completely protecting position about the car of Figure 2; however, the windshield and the rear portion of the hood will not be closely fitted by the cover since the latter will be suspended and spaced slightly above. This portion of the cover is therefore vulnerable to damage from above, and particularly in high winds. Accordingly, it has been found that the extensible qualities of thermoplastic material of the class referred are well adapted to stretching to more closely conform to this portion of the car when tension is properly applied to the cover.

It is preferred, therefore, to initially adjust the cover beneath the bumpers so that the material above the windshield and hood droops somewhat. Thereafter, such material is tensioned across the width of the car and preferably along a line that bisects the angle between the cowl and windshield, as is shown in Figure 2 and by the use of a continuous, elongated and tensioned member 15, preferably an elastic cord as previously noted. Both cord 6 and member 15 may be made entirely or in part of an elastic material, for example, rubber such as belts of small cross section are made of. The ends of cord 15 may be adjustably connected to means such as metal hooks 16 for suitably engaging the lower endge of the car body and being thus maintained by the tension exerted by the cord 15. Since the hooks may take any of a number of configurations depending on the shape of the cooperating lower edge of the car body, they have not been shown in detail. Obviously, a single hook would suffice in most cases or such means might consist of one part adapted to be clamped to the body or frame channel and a cooperating, separable part connected to the end of the cord 15. The portion of such hook that is likely to bear against the cover material may be rubber covered to eliminate any risk of abrasion of the latter.

The initial adjustment of cord 15 places the material under considerable tension and brings the latter to within a short distance of the windshield and hood surface. Thereafter, under normal exposure to the sun, the material further stretches to lie closely against the car at this point. For several successive positionings, the foregoing procedure is repeated so that the cover is slightly stretched each time and finally the use of the cord 15 may be dispensed with unless desired as a further protection against the wind. It should be noted that the final stretching of the material as described eliminates all unsightly bunching of the material along the sides of the body between the fenders and the front doors which would exist initially in installing the cover on a car having as steep a windshield and as low a cowl as that shown in Figure 2.

From the foregoing, the adaptability of my automobile cover to cars of different overall dimensions or body types will be apparent. The cars of longest overall body length will utilize practically all of the cover over the normally visible exterior of the car, while shorter cars will have more or less of the cover extending also forwardly of the rear bumper and beneath the gasoline tank. Since there is considerable overhang in cars today such latitude of adjustment is sufficient. Also if necessary, the overhang of the front bumper may be utilized for longitudinal, effective shortening of the cover, the centrally disposed slit and its adjustable closure adapting the cover to different hood lengths and radiator or grill heights.

Figure 3:
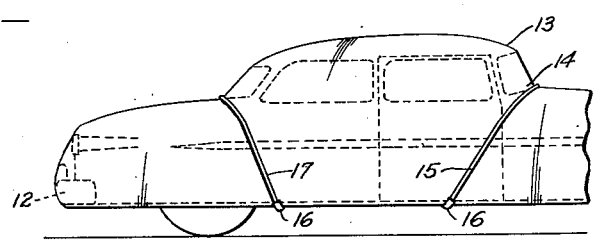
Figure 3 is a side view of a trunk deck type of automobile having my cover installed thereon.

For cars provided with a more horizontal trunk deck such as is shown in Figure 3 as distinguished from the swept back deck of Figure 2, it is a relatively simple matter to provide an additional, elastic cord 17 to more closely fit the cover to the car across this area as shown. Thereby, undue permanent stress and strain on the material with the possibility of puncture by foreign objects is minimized. The progressive improvement in the form fitting relation of the cover and car exterior with each positioning is as described for Figure 2 hereinbefore. Also, since the stretching of the cover occurs over a considerable area, there is no local weakening of the latter.

Figure 4:
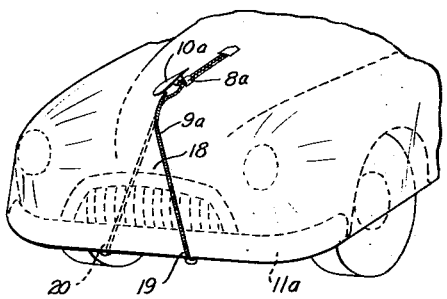
Figure 4 is a perspective view of the front of an automobile having installed thereon, a modified form of cover.

In Figure 4 there is shown a modified form of automobile cover according to this invention wherein the slit 7 of Figure 1 is extended to and across the hem at right end of the cover. Thereafter, two identical, right triangles are cut from similar sheet material and the longer leg of each such triangle is sewed or heat sealed to the corresponding outer margins of material defining the elongated slit, so that two overlapping triangular portions of material 18 may be disposed in front of the radiator grill as shown in Figure 4. The outermost triangular sheet having margin 9a extends to and beneath the lower edge of the front bumper 11a at the point 19 where it is connected in any suitable manner to one end of the elastic cord 6, emerging from the hem 5, the opposite end of such cord being connected to the lower end of the underlying triangular portion at 20. Margin 9a is shown in Figure 4 as being provided with a slide fastener track for its full length for simplicity of manufacture although only the upper part is used for the slider 8a to the ornament 10a except as a marginal reinforcement for the material. The form of the invention shown in Figure 4 provides a somewhat closer fitting of the cover about the radiator grill in some cars due to the individual tensioning of the areas of the cover above the fenders and the junctions of the hood and fenders.

The removal of the cover from the car requires no particular instructions other than to first open the slide fastener sufficiently to allow the radiator ornament to be withdrawn before lifting the hem from either bumper.

It may be well to summarize the chief advantages of the automobile cover of this invention which are the wide adaptability of the same dimensioned cover to cars of various body types and overall dimensions, the snug fit of the air and moisture impervious cover at all portions of abrupt curvature such as at the windshield and rear window and also throughout the lower edge portion of the body thereby restricting the circulation of air therein which in coastal regions is especially deleterious, the progressive improvement in the fitting of the cover about the car under the varying weather conditions to which it is subjected, and the transparency, light weight and economy of manufacture of the cover as disclosed. It may be further noted that the folded cover may be contained within a carton no larger than that customarily used for automobile seat covers.

While I have shown preferred embodiments of my invention both as to the cover structure and also preferred methods of snugly fitting the same to an automobile, it will be readily apparent that various changes may be made therein such as the elimination of the slit for the radiator ornament, for example, since there is at least one make of automobile known to me that uses no ornament whatever, so that an axially disposed stripe of contrasting color would suffice in such cases. Furthermore, while the means disclosed for tensioning the material are convenient and inexpensive, it will be apparent that the same result could be obtained in custom installations by commercial garages by ambient heating, for example, and the application of pressure by mechanical means or pneumatic means such as a transverse blast of air to produce elongation of the material longitudinally of the car top and hood with the greatest elongation, of course, in the sharply contoured regions earlier mentioned.

Therefore, I do not desire the invention described herein to be limited except as may fully and fairly be within the scope of the following claims.

I claim:

1. A protective cover that may be quickly disposed in snugly fitting relation over streamlined automobiles of various body types and overall dimensions and readily removed therefrom comprising a generally elliptical sheet of thermoplastic, transparent material having an axially disposed slit at one end thereof for receiving the radiator ornament of an automobile therein and having a marginal hem for disposition about the lower edge portions of an automobile body, elongated elastic means disposed within said hem for snugly gathering the marginal portions of said cover about the lower edge portions of said automobile body and an elongated tensioned member disposable transversely upon said cover when in position over said automobile body and means carried by the ends of said member and engageable with said lower edge portions for maintaining said cover in snugly fitting relation with said body.

2. A protecting cover that may be quickly disposed in snugly fitting relation over a modern, streamlined automobile comprising a generally elliptical sheet of thermo-plastic, transparent material having overlapping, centrally disposed, triangular portions at one end for disposition over the radiator grill of an automobile and having an axial slit adjacent said portions for receiving therein the radiator ornament of said automobile and resilient means carried by the boundary of said elliptical sheet for snugly gathering the marginal portions of said cover about the lower edge portions of said automobile and means for connecting the extremities of said overlapped triangular portions to the front end of said automobile and below said grill.

3. The method of protecting an automobile from the elements comprising, enveloping the external, visible surface of the automobile in a sheet of generally elliptical, thermo-plastic material which may be permanently expanded at elevated room temperature, securing the end portions of said sheet to the front and rear bumpers, respectively, of the car and applying pressure externally of said sheet above those sharply contoured portions of the car from which said sheet is initially spaced and at said temperature to stretch said material to more closely conform to said sharply contoured portions.

4. A cover that may be quickly disposed in protecting relation over streamlined automobiles of various body types and overall dimensions and readily removed therefrom, comprising a generally elliptical sheet of thermo-plastic, transparent material having a marginal hem for disposition about the lower edge portions of an automobile body, elongated, elastic means disposed within said hem for snugly gathering the marginal portions of said cover about the lower edge portions of said automobile body, and elongated means disposable transversely over said cover and above the base of the automobile windshield for tensioning said cover and stretching the same to lie more closely adjacent said windshield.

CHARLES F. ELLIOTT.

REFERENCES CITED

The following references are of record in the file of this patent:

UNITED STATES PATENTS

| Number | Name | Date |
|---|---|---|
| 1,728,437 | Mott | Sept. 17, 1929 |
| 1,905,973 | Levine | Apr. 25, 1933 |
| 2,243,981 | Rowan | June 3, 1941 |
| 2,248,655 | Bila | July 8, 1941 |
| 2,279,812 | Bartlett | Apr. 14, 1942 |
| 2,490,250 | Boener | Dec. 6, 1949 |